No. 836,989. PATENTED NOV. 27, 1906
G. A. OLIVER.
BALANCED COMPENSATING PIPE JOINT.
APPLICATION FILED MAR. 26, 1906.
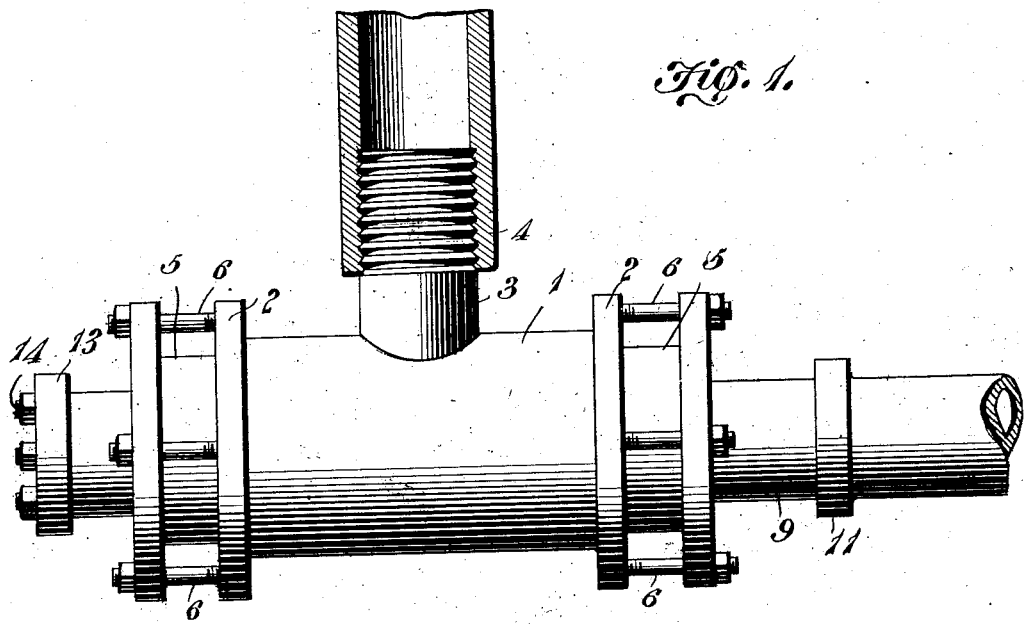
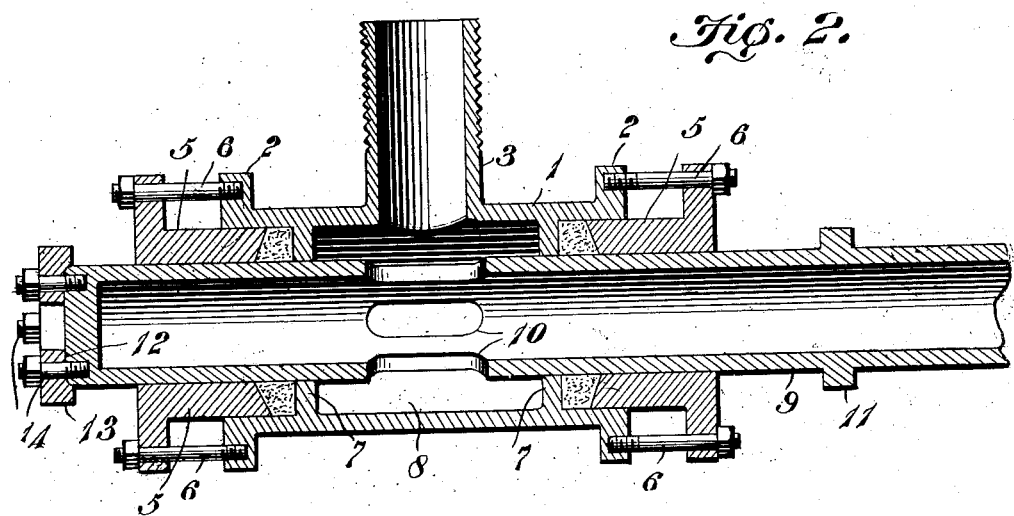
George A. Oliver,
INVENTOR.

UNITED STATES PATENT OFFICE.

GEORGE A. OLIVER, OF GARDINER, MAINE.

BALANCED COMPENSATING PIPE-JOINT.

No. 836,989.            Specification of Letters Patent.            Patented Nov. 27, 1906.

Application filed March 26, 1906. Serial No. 308,129.

*To all whom it may concern:*

Be it known that I, GEORGE A. OLIVER, a citizen of the United States, residing at Gardiner, in the county of Kennebec and State of Maine, have invented a new and useful Balanced Compensating Pipe-Joint, of which the following is a specification.

This invention relates to slip-joints for use in connection with steam-pipes; and its object is to provide a joint of this character for connecting two pipes extending at angles to each other so they cannot become detached through expansion or contraction of the pipes and which does not necessitate anchoring in order to hold the pipes in proper relation to each other.

The invention consists of a sleeve to which one of the steam-pipes is adapted to be connected, and extending through the sleeve is a longitudinally-slotted pipe one end of which is closed. The entire interior of the sleeve is of greater diameter than the exterior of the slotted pipe, and therefore a compartment is formed around the slotted pipe to facilitate the passage of steam from one of the pipes to the other. Packing-glands are located in the ends of the sleeve to prevent leakage of steam.

The invention also consists of certain other novel features of construction and combinations of parts which are to be hereinafter more fully described, and pointed out in the claim.

In the accompanying drawings is shown the preferred form of the invention.

In said drawings, Figure 1 is a side elevation of the joint, and Fig. 2 is a longitudinal section therethrough.

Referring to the figures by numerals of reference, 1 is a substantially cylindrical sleeve with a collar 2 at each end and a tubular stem 3, which projects from the sleeve at a point between its ends and is threaded to engage a steam-pipe 4. A gland 5 is arranged at each end of the sleeve 1, and bolts 6 extend through the collars 2 and the glands 5 for the purpose of tightening the glands to render them steam-proof. The glands coöperate with interior flanges 7, which are cast within the sleeve and form a steam-compartment 8 therebetween. A steam-pipe 9 extends through the glands and the flanges 7, and longitudinal slots 10 are formed in that portion of the pipe located within the compartment 8. A collar 11 is formed on the pipe 9 adjacent one of the glands, and the end of the pipe is closed and projects into the recessed face 12 of a head 13 in the form of a ring, adapted to be secured to the end of the pipe 9 by means of screws 14 or in any other preferred manner. It will be obvious that with this construction when steam enters pipe 9 it will escape through the slots 9 into the compartment 8. It will then flow outward into pipe 4. The passage of steam through the pipe will cause more or less expansion and subsequent contraction thereof, and this is allowed by reason of the fact that the pipe 9 extends through the sleeve 1 and is capable of longitudinal movement therein. This movement will be limited by head 13 and collar 11, and the slots 10 will at no time be removed from the compartment 8. With this construction there is no danger of the two pipes becoming separated because of any expansion or contraction thereof, and steam is at all times free to pass from one pipe to the other. As the sleeve 1 embraces pipe 9 at opposite sides of the slots 10, the joint becomes perfectly balanced and does not require any anchoring means for holding the two parts in proper relation.

I claim—

The combination with a sleeve having interior annular flanges between the ends thereof and forming a steam-compartment, and an outlet from said compartment; of glands in the ends of the sleeve and connected thereto, a pipe slidably mounted within the glands and surrounded by the interior flanges, said pipe being closed at one end and extending through the center of the steam-compartment, a stop-ring detachably secured upon and extending beyond the closed end of the pipe, and an annular collar integral with the pipe, the sleeve and glands being interposed between the collar and the stop-ring to limit the independent movement of the pipe, said pipe having a plurality of longitudinal slots for directing steam into all portions of the steam-compartment.

In testimony that I claim the foregoing as my own I have hereto affixed my signature in the presence of two witnesses.

GEORGE A. OLIVER.

Witnesses:
     E. L. BUSSELL,
     FRANK C. ANDREWS.